(12) United States Patent
Muro et al.

(10) Patent No.: US 6,505,186 B1
(45) Date of Patent: Jan. 7, 2003

(54) METHOD OF MANAGING FEATURE DATA

(75) Inventors: Keiro Muro, Kokubunji (JP); Kazuaki Iwamura, Kodaira (JP); Yasuei Nomoto, Hitachinaka (JP); Kazuo Tsutsui, Hitachiohta (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/298,966

(22) Filed: Apr. 26, 1999

(30) Foreign Application Priority Data

Apr. 27, 1998 (JP) .......................................... 10-132711

(51) Int. Cl.$^7$ .............................................. G06F 17/30
(52) U.S. Cl. ........................... 707/2; 707/100; 707/103; 707/104.1; 707/203
(58) Field of Search ................................ 707/103, 104, 707/2, 100, 101, 102, 104.1, 200, 203; 345/418, 964; 701/200

(56) References Cited

U.S. PATENT DOCUMENTS 6,092,076 A * 7/2000 McDonough et al. ....... 707/102
6,151,031 A * 11/2000 Atkins et al. ................ 345/441
6,292,803 B1 * 9/2001 Richardson et al. ........ 707/102

FOREIGN PATENT DOCUMENTS

| JP | 8-44846 | 2/1996 |
| JP | 09-237279 | * 9/1997 |

* cited by examiner

*Primary Examiner*—Kim Vu
*Assistant Examiner*—Joon Hwan Hwang
(74) *Attorney, Agent, or Firm*—Mattingly, Stanger & Malur, P.C.

(57) ABSTRACT

The present invention offers a feature data management method which provides data indicating created time and destroyed time of geographic object for feature data, thereby increasing the speed and facilitating a search in time direction. By this method, for example, if the building C is built at time Ts and destroyed at time Te, created time Ts and destroyed time Te of geographic object C are registered in the feature data, whereby it can be managed by a database that the geographic object C existed only between times Ts and Te.

6 Claims, 15 Drawing Sheets

METHOD OF MANAGING FEATURE DATA

BACKGROUND OF THE INVENTION

The present invention relates to a feature data management method in graphic processing systems such as a Geographic Information System (GIS) and Computer Aided Design (CAD), and particularly to a method for efficiently managing data changing with time, such as changes of a view of a town caused by the construction and removal of houses.

In a department of local autonomies and the like that use geographic information, it is important to store past history information. Facility management requires to keep track of maintenance information and utilization status of the past, while in city planning, the history of city changes is useful for the analysis of current situation and the prediction of the future.

Heretofore, local autonomies and the like have managed the geographic information with paper maps in such a manner that (1) change portions are written directly to maps, (2) the maps are wholly rewritten once every several years, and (3) past paper maps are stored in a warehouse. However, this method requires considerable efforts to search past maps and provides a heavy load to store a large number of past maps.

Recently, a Geographic Information System (GIS) built upon an electronic version of paper map has been developed and used. The GIS handles an electronic version of paper map, resulting in easier update of maps and the storage and search of past maps in comparison with paper maps.

Conventional GISs, to store past geographic information, have employed a method of backing up the contents of geographic information database (DB) to external storage media such as digital audio tape (DAT) regularly, for example, once a month.

In a patent specification entitled "Map Use System" (Japanese Published Unexamined Patent Application No. Hei 8-44846), a method is disclosed which manages deleted and added geographic data in a geographic database and manages the geographic database when geographic data is modified at a time.

However, two problems have been identified with these methods: (1) search in time direction, for example, "change in the region in the last decade", requires reference to all past backup data; and (2) because all geographic data must be backed up, an enormous amount of time for backup and a large space to store history data will be required.

With the widespread use of Internet and Intranet, GISs have been adapted to network environments. With geographic information stored in a DB server, each user has become able to gain access to the server at the use's terminal to obtain maps and other geographic information via a network. However, since geographic information generally has high volumes of data, there has been the problem of (3) increased communication time and increased load on networks.

SUMMARY OF THE INVENTION

Objects of the present invention are to solve the following problems:

(1) fast and easy search in time direction
(2) minimizing maintenance (backup) time and space to history data
(3) obtaining maps and other geographic information via a network with a minimum of communication time and load on the network To achieve the above described objects, the present invention provides a feature data management method which handles as feature data each of a plurality of geographic objects such as houses and roads, and registers the feature data in a database for management. The feature data of the geographic objects includes creation time and destruction time data thereof, and when a geographic object is created, created time is stored in feature data thereof to register the feature data in the database, while when a geographic object is destroyed, destroyed time is stored in feature data thereof stored in the database to register the feature data in the database. Thereby, when time is specified to search for feature data of geographic objects registered in the database, the feature data of a geographic object that the specified time is between the created time and destroyed time can be obtained.

The present invention also offers a feature data management method which handles as each feature data of a plurality of geographic objects such as houses and roads, and registers the feature data in a database for management. As feature data of the geographic objects, data comprising a set of three items, feature changed time, name of the changed attribute, and differential value of the changed attribute, is provided. When a geographic object changes as time elapses, each time the change occurs, the feature data of the geographic object is registered to reflect the change in the database, in order that, of the set of data items as the feature data of the geographic object, change occurrence time is stored in the feature changed time item, a changed attribute of the feature is stored in the item of name of the changed attribute, and a change amount of the attribute is stored in the item of differential value of the changed attribute. Thereby, when time is specified to search for feature data of geographic objects registered in the database, the feature data of geographic objects containing changes which have occurred until the specified time can be obtained.

Feature datum of the geographic object has an unique ID number, and also has 2 ID numbers as its attributes, which point feature and past feature data respectively. When a geographic object changes as time elapses, feature data of the geographic object after the change is newly created, and in the new feature, the ID number of old feature is stored as the past feature, and in the old feature, the ID number of the new feature is stored as the future geographic object after the change is stored as ID number data of the future feature. Thereby, changes of geographic objects due to an elapse of time can be managed.

The present invention also offers a feature data management method which handles as feature data each of a plurality of geographic objects such as houses and roads, and with a collection of features treated as an area, registers feature data in a database for management, as one belonging to an area.

A huge feature extending beyond one area, like a road which crosses beyond many areas, is represented by a collection of features in each area. Each feature datum has an unique ID number, and also has 2 ID number as its attributes, which point of the feature data connected to the first point of the feature, and feature data connected the last point of the feature, respectively. Thereby huge geographic objects extending beyond one area can be managed.

Furthermore, when feature data is transferred to a client system connected to the database through a network, if the client system already obtains old feature data in the database, change differences between the old feature data in the database and feature data at a specified time are transferred to the client system.

In a case where the database is not searched on the basis of time and fast space search is required, only feature data existing at time of specification is extracted from the database, and a database from which time data is temporarily excluded is rebuilt by excluding the time data from the extracted feature data. Thereby fast space search is performed for the rebuilt database.

By setting feature rotation angle, parallel movement amount, and enlargement ratio as the change attributes, changes of geographic objects can be represented by a small number of parameters.

DETAILED DESCRIPTION OF THE PREFERRED EMBODIMENTS

Hereinafter, an embodiment of the present invention will be described with reference to the accompanying drawings.

Figure 2:
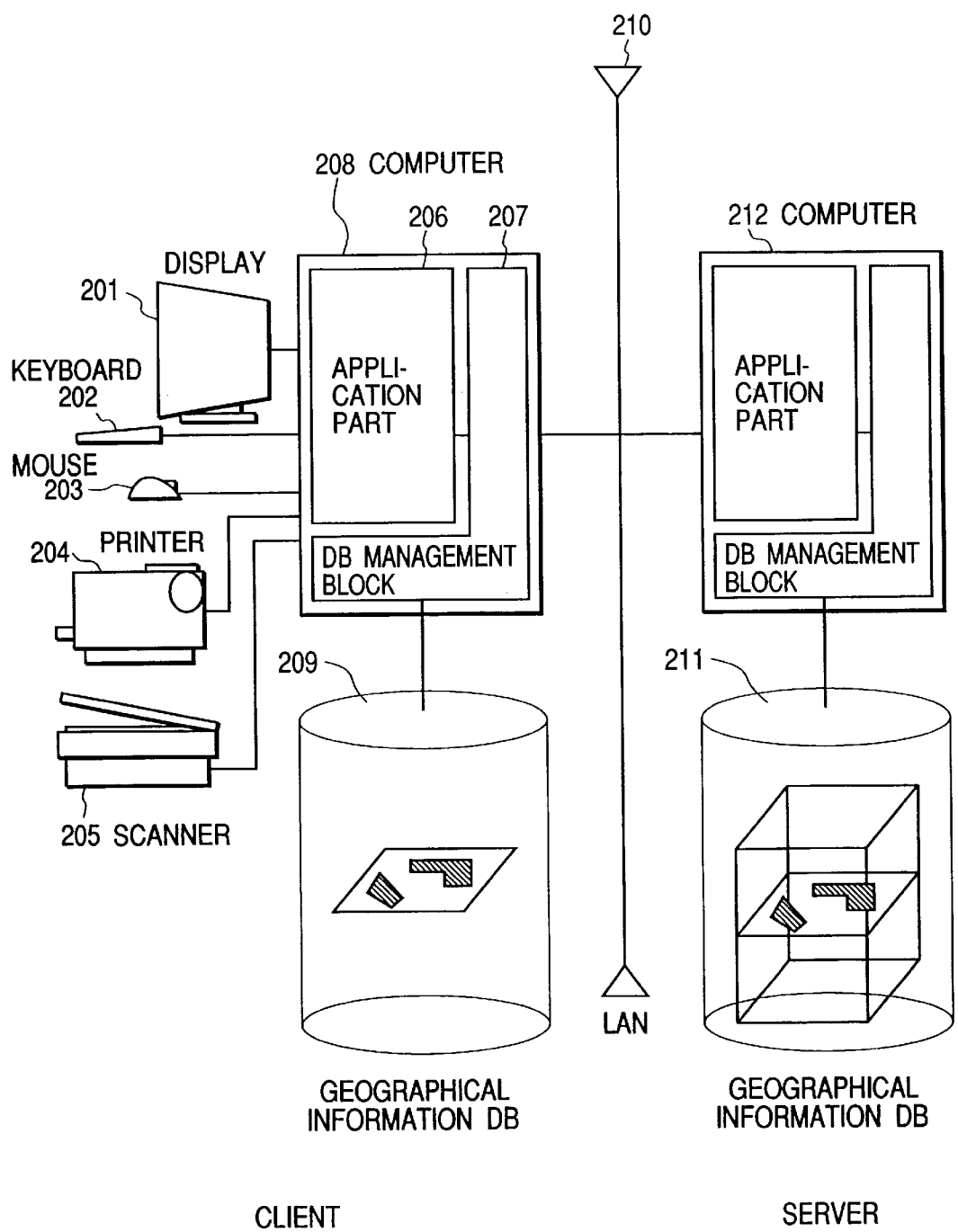
FIG. 2 is a configuration diagram of a Geographic Information System to which the present invention is applied.

FIG. 2 is a configuration diagram for a Geographic Information System embodied using a time history management method of the present invention.

A display 201 is used to display features and the like. A keyboard 202 and a mouse 203 are interface equipment used for operations on features during searching and editing of the features.

A printer 204 is used to provide output of features. A scanner 205 is used to read paper maps and other features for transformation into digital form.

Features transformed into digital form are stored in a geographic information DB (database) 209 within a storage device such as memory and hard disk.

The Geographic Information System is executed on a computer 208 such as a personal computer and a workstation.

The Geographic Information System can be distributed on a network 210 such as LAN (local area network).

A user client 208 to search geographic information and a server 212 having the geographic information DB are installed on different computers so that geographic information in the server can be searched remotely.

Further, the geographic information DB 211 can also be distributed to and managed by a plurality of servers by area or field so that one client can gain access to a plurality of servers.

The Geographic Information System comprises a DB management block 207 that accesses a local geographic information DB 209 within the local system and a remote geographic information DB 211 on a network to search or update geographic information, and a block 208 of a plurality of applications operating on the DB management block 207.

The application block includes geographic information reference and update tools, tools for creating geographic information from paper maps, aerial photographs, and the like, and analysis and simulation tools by use of geographic information.

Figure 3:
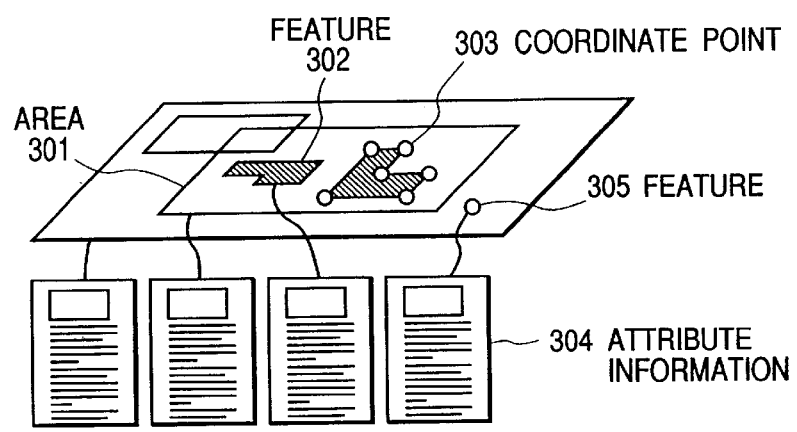
FIG. 3 is a diagram showing the relationship among areas, features, coordinate points, and attribute information which constitute geographic information.
Figure 4:
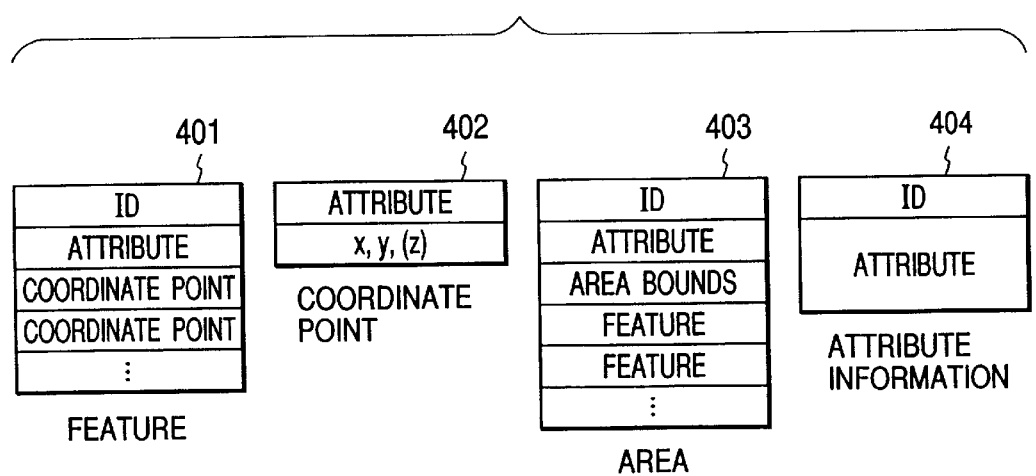
FIG. 4 is a diagram showing the relationship among areas, features, coordinate points, and attribute information which constitute geographic information.

FIGS. 3 and 4 show the data structures of geographic information on which to base extension of the present invention.

Geographic information comprises feature 302, coordinate points 303, areas 301, and attribute information 304.

The feature 302 represents the shape of geographic objects such as houses and roads.

Features are basically represented by poly-line. For example, roads are represented by open poly-line, district boundaries and contours by closed poly-line, houses by a polygonal column with height appended to closed poly-line, and underground pipes by poly-line extended to three dimensions.

Reference numeral 401 indicates the data structure of feature.

Feature data comprises ID thereof, attributes such as line color and number of coordinate points in the feature, and one or more coordinate points 303. One point (305) can also be regarded as a feature comprising one coordinate point.

As the ID of a feature, a serial number unique in an entire system is used. To keep the ID unique among different systems, coordinates of feature (the gravity center, etc.) may be used instead of a serial number.

Coordinate points 303 are points for forming lines of the feature 302. A reference numeral 402 indicates the data structure of coordinate point.

Data of coordinate point comprises attribute such as point color and coordinates x and y (z is included in the case of three-dimensional features) of the point.

An area 301 indicates an area containing features. This area 301 corresponds to one map.

An area may be of any shape; for example, rectangular regions of 500 m by 700 m formed in mesh form, and districts inside closed poly line can be defined as areas.

A reference numeral 403 indicates the data structure of an area.

Data of area comprises an ID thereof, the kind of geographic information (street map, urban planning diagram, etc.), attribute such as created date, and zero or more features 302 contained in the area.

Attribute information 304 is non-feature information linked to geographic information.

For example, premise dimension and householder name appended to house features, and road width, road type, and traffic control information appended to road features are managed as attribute information. As attribute information, any information such as documents, images, and other related features can be appended.

Attribute information can be managed by storing an attribute information ID in the attribute field (shown as attribute in the figure) of a feature 401, a coordinate point 402, and an area 403 constituting geographic information and referring to attribute information 404 in another table using attribute information ID.

The reference numeral 404 indicates the data structure of attribute information.

Attribute information comprises an ID thereof and the contents of the attribute.

Hereinafter, a description will be made of time extension performed for the geographic information.

The present invention classifies time extensions as (1) "creation/destruction extension, (2) "change" extension, and (3) "replacement" extension.

Hereinafter, the time extensions will be described by using features constituting geographic information as an example, however, the same time extensions are also applicable to coordinate points, an area, and attribute information constituting geographic information.

Creation/destruction extension indicates creation and destruction of geographic information, such as houses built and taken down for removal.

Figure 5:
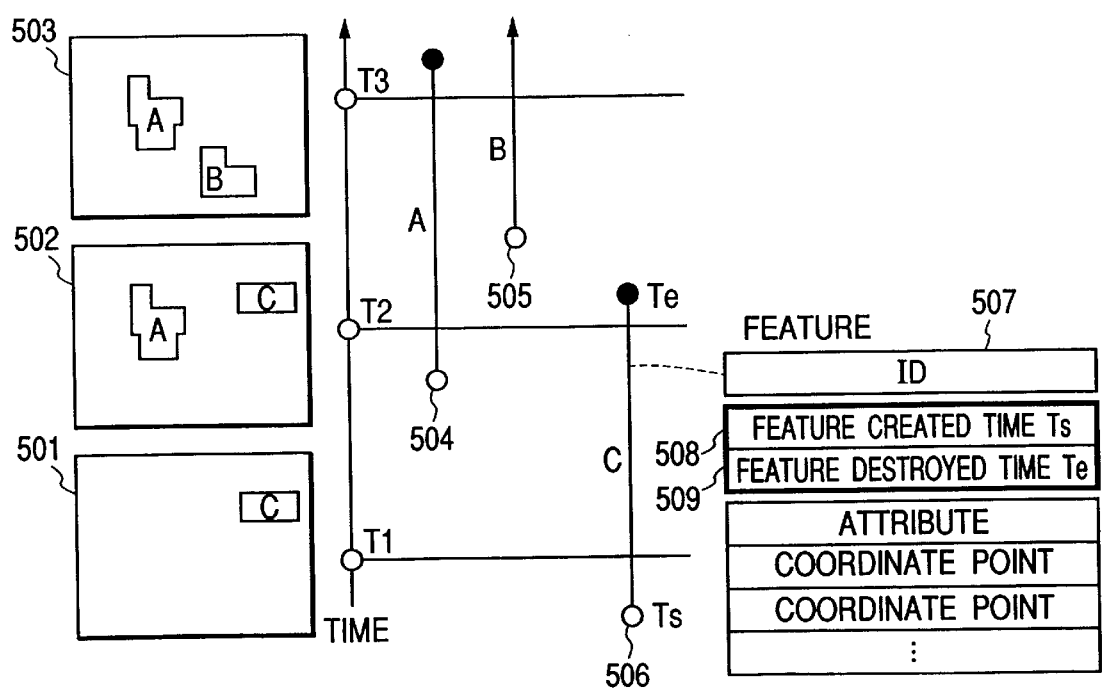
FIG. 5 is a diagram for explaining a method of extending creation/destruction time for features.

FIG. 5 illustrates creation/destruction extension.

Following descriptions are about houses built and taken down for removal as shown in 501, 502, and 503 in the course of time elapse of T1, T2, and T3.

Assume that the only building C exists in 501, a building A is newly built in 502, and a building B is newly built and a building C is taken down in 503.

Figure 18:
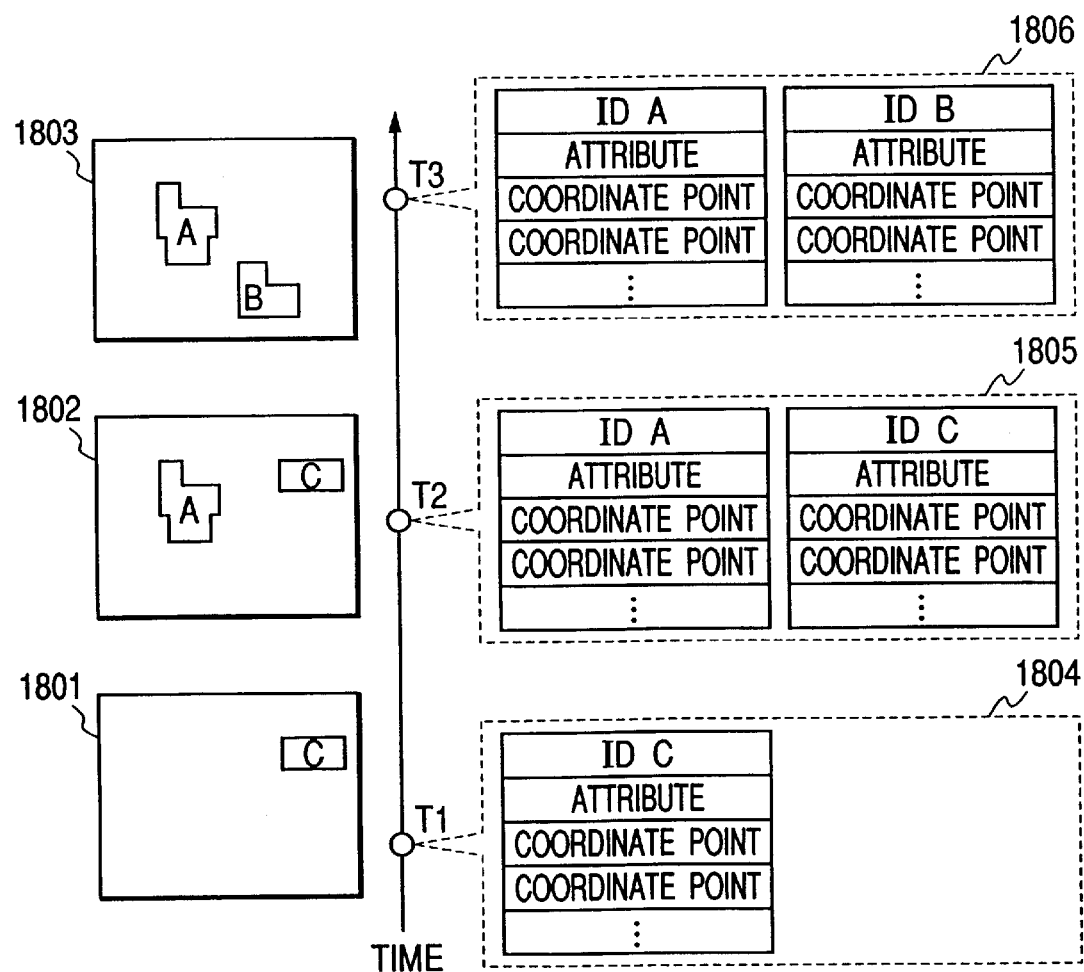
FIG. 18 is a diagram for explaining a conventional method for performing time management.

In the prior art (FIG. 18), history management has been implemented by storing all of geographic information (features) at a certain point. That is, conventionally, the building C (1801) has been stored as geographic information (1804) at time T1, the buildings A and C (1802) at time T2 as geographic information 1805, and the buildings A and B (1803) at time T3 as geographic information 1806.

The present invention appends feature created time Ts (508) and feature destroyed time Te (509) to the data structure 507 of feature.

Creation and destruction of features A, B, and C is represented on the time axis as 504 for A, 505 for B, and 506 for C.

By appending feature created time Ts (508) and feature destroyed time Te (509) to the data structure of the feature, when a time search to display geographic information at a particular date is requested for the geographic information, the specified time is compared to creation/destruction time of feature, and it can be determined that if the specified time is between creation and destruction times, the geographic information exists. If not, it does not exist in that time.

If the feature still exists without being destroyed, an identifier (∞) indicating undecided destruction time is stored in the destruction time field.

Change extension indicates change of geographic information such as change from a one-storied house to a two-storied house.

Figure 6:
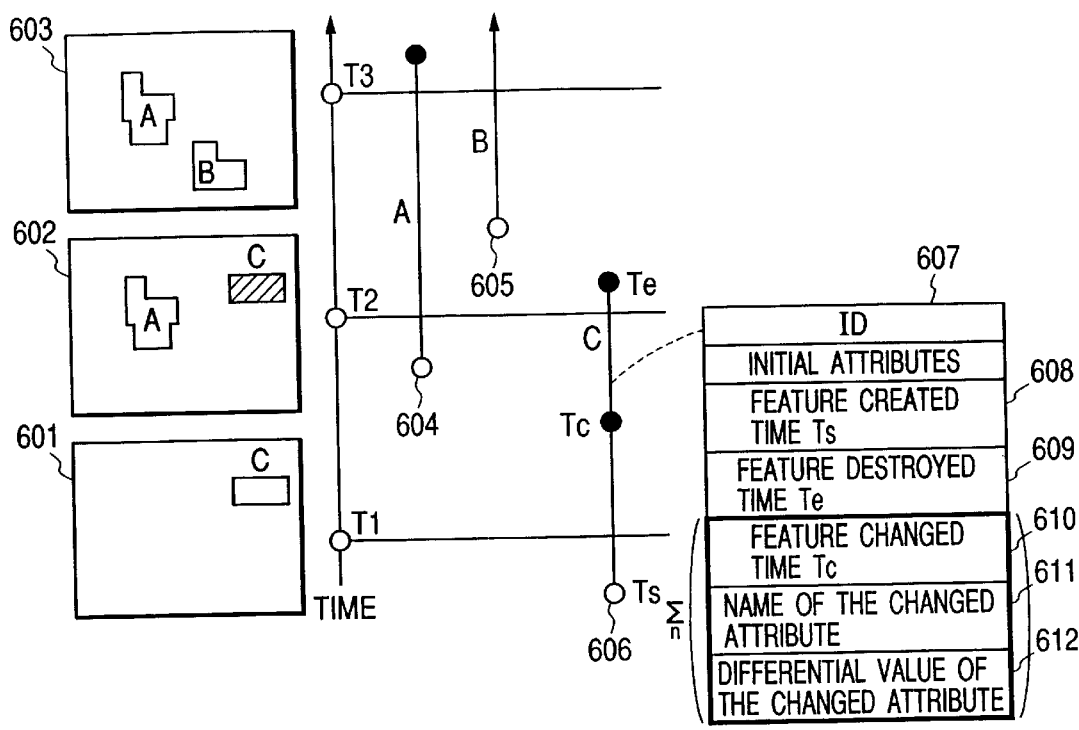
FIG. 6 is a diagram for explaining a method of extending change time for features.

FIG. 6 illustrates change extension.

Assume that building C is created at time Ts, changes in attribute at time Tc (e.g., change from a one-storied house to a two-storied house), and is destroyed at time Te.

To represent change extension by extending the data structure (507 in FIG. 5) of feature subjected to creation/destruction extension, as shown in 607 of FIG. 6, three change information items, feature changed time 610, a name of the changed attribute 611, and a differential value of the changed attribute 612, are inserted after feature created time Ts (608) and feature destroyed time Te (609).

Feature changed time 610 indicates Tc when a change occurred. Name of the changed attribute 611 and differential value of the changed attribute 612 are paired, indicating what type of the attribute of the feature changed and to which value it changed.

The three change information items, each time a change occurs, are inserted collectively in the data structure.

The number of changes that occurred is set in the header information of feature.

When two or more attributes occurred at the same time Tc, as abbreviated representation, a set of a plurality of names of the changed attributes 611 and differential values 612 of the changed attributes can also be stored for one feature changed time 610.

An attribute of a feature at certain search time can be obtained by accumulatively adding differential values of the changed attribute until the search time to the initial attribute at feature creation.

Figure 7:
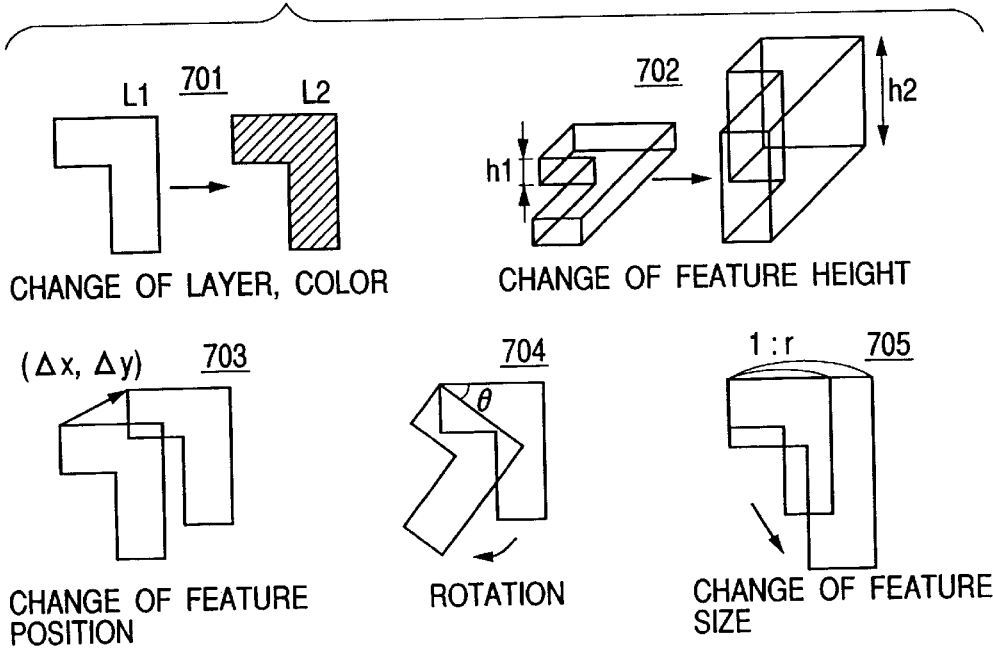
FIG. 7 is a diagram showing an example of extending change time for features.

Since change extensions change attributes included in a feature, types can be defined according to the number of the attributes. FIG. 7 shows changes of typical attributes.

Among examples are layer/color change 701, height change 702, etc. The layer indicates classification such as town boundaries, house frames, road lines, and the number of floors of a house.

Change extension takes place on changes such as change of house height, change of house material quality, and change of resident information due to an extension or rebuilding of a house.

As changes of an entire feature, change in a feature position 703, a feature rotation 704, and change in a feature size 705 can be defined.

Change in the feature position, feature rotation, and change in the feature size take place for shift of the house position due to earthquake and movement of the feature position due to a house relocation or change in urban planning.

Since these allow changes of features to be represented by a small number of parameters although coordinate points must be recalculated during feature display or search, the capacity of overall geographic information can be reduced.

As differential values of the changed attribute 612, a movement amount of a feature ($\Delta x$, $\Delta y$), a rotation amount $\theta$, and an enlargement ratio r are stored for change in the feature position, the feature rotation, and change in the feature size, respectively.

Replacement extension also indicates change of geographic information like change extension.

Change extension has change information inside a data structure of a feature, while replacement extension uses two or more features to represent a change by replacing one feature by another feature.

Replacement extension is used to represent changes whose data size is too large to represent by using change extension.

If change extension is repeated for an identical feature, the size of the feature itself would become large and require more search time. However, search speed can be increased by splitting the feature to two or more features by replacement extension.

Figure 8:
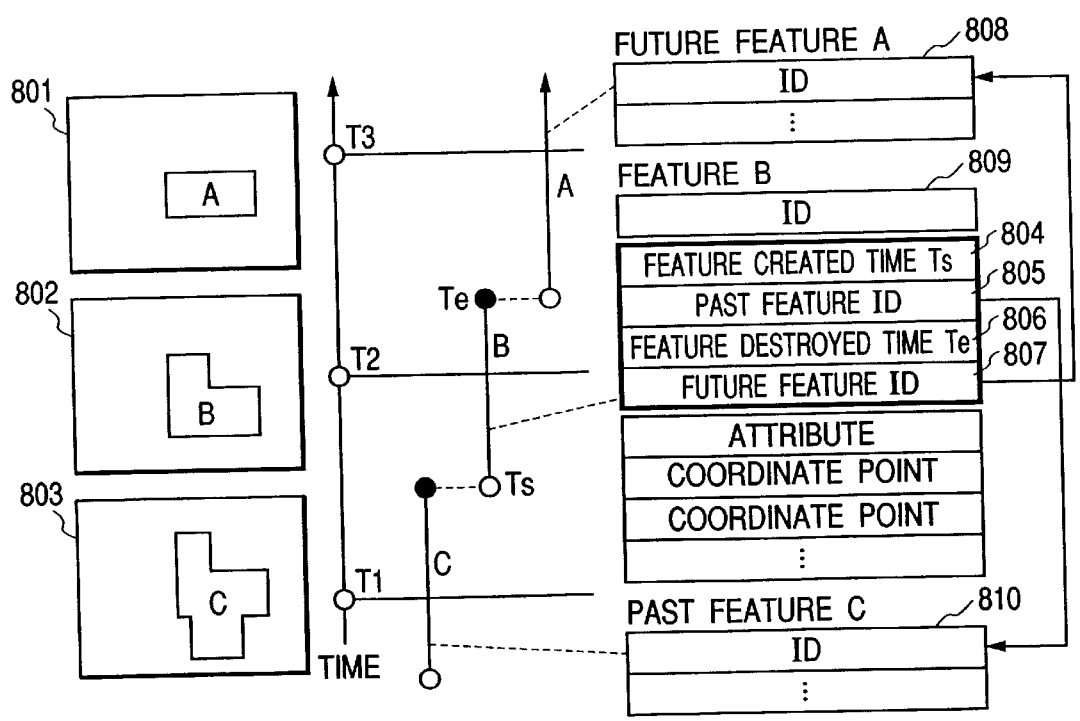
FIG. 8 is a diagram for explaining a method of extending replacement time for features.

FIG. 8 illustrates replacement extension.

Assume that the building C was rebuilt to the building B at time Ts and to the building A at time Te.

The features of buildings A, B, and C are respectively stored in an area as different features.

To represent replacement extension by extending the data structure (507 in FIG. 5) of the feature subjected to creation/destruction extension, as shown in 809 of FIG. 8, as the respective additional information of created time Ts (804) and destroyed time Te (806), an ID 805 pointing to a past feature 810 and an ID 807 pointing to a future feature 808 are stored.

When the ID field of the past feature or the future feature is empty, it is defined that the feature has been created or destroyed, and when the ID field is not empty, it is defined that the feature has been replaced by a feature pointed to by the ID.

If the feature still exists without being destroyed, an identifier (∞) indicating undecided destruction time is stored in the destruction time field.

Figure 1:
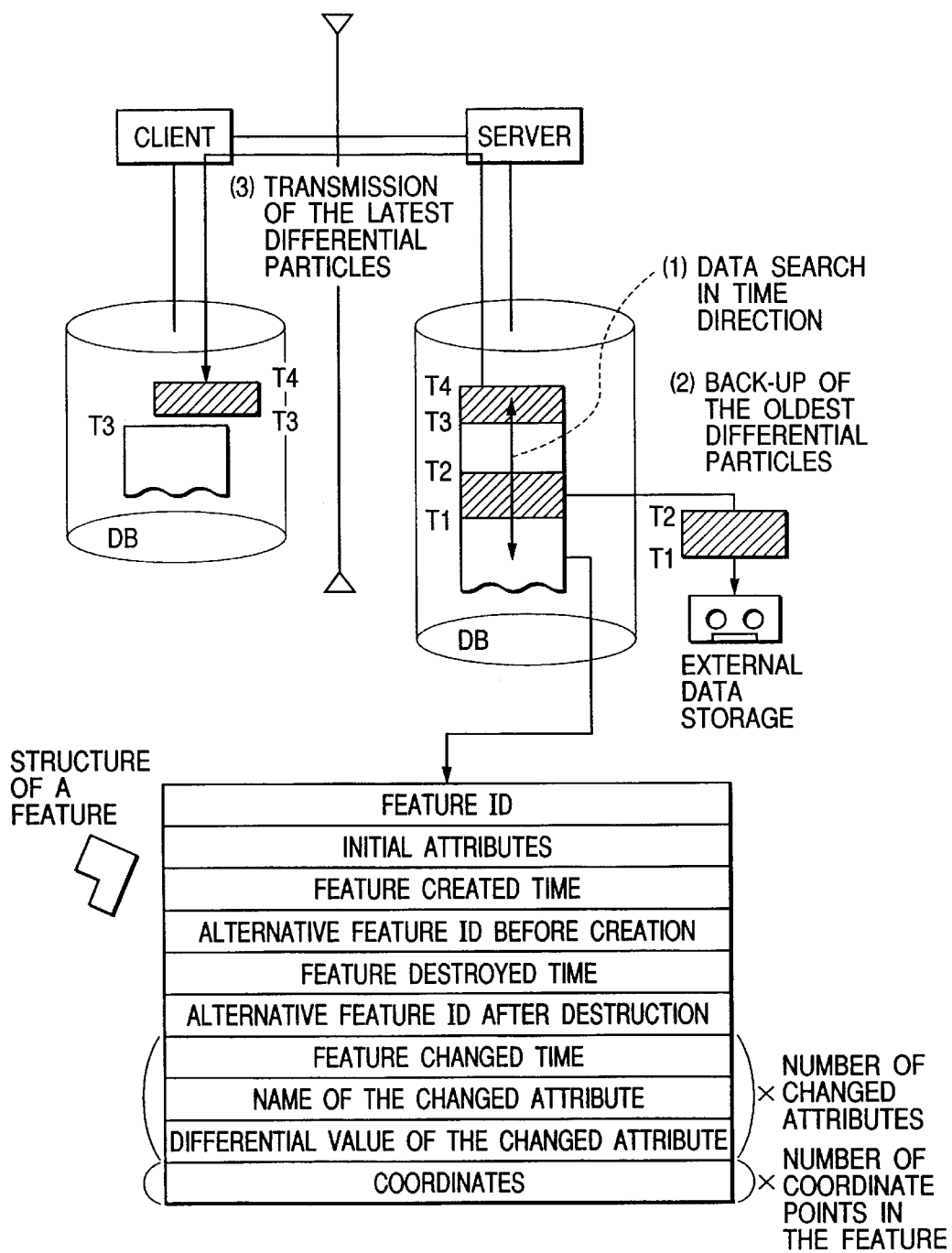
FIG. 1 is a diagram outlining characteristics of the present invention.

FIG. 1 shows a general-purpose table to which all the three time extensions which have been heretofore described, (1) creation/destruction extension, (2) change extension, and (3) replacement extension, are appended.

Herein, an alternative feature ID before creation is the same as a past feature ID and an alternative feature ID after destruction is the same as a future feature ID. The number of sets of feature changed time, name of the changed attribute, and a differential value of the changed attribute is equal to the number of changes.

Although this is time extension for an example of feature, an extended table is also obtained similarly for other geographic information, such as coordinates, an area, and attribute information.

The upper portion of the figure schematically shows (1) data search in time direction, (2) back-up of the oldest differential particles, and (3) transmission of the latest differential particles.

(1) Data search in a time direction means a fast search for maps and information in a space area at a given past time or future time by appending time information to features, (2) back-up of the oldest differential particles means selecting only information of, e.g., ten or more years ago for backing up to external data storage. (3) transmission of the latest differential particles means, for example, if a client has information of up to one year ago, transmitting only subsequent latest data.

Figure 9:
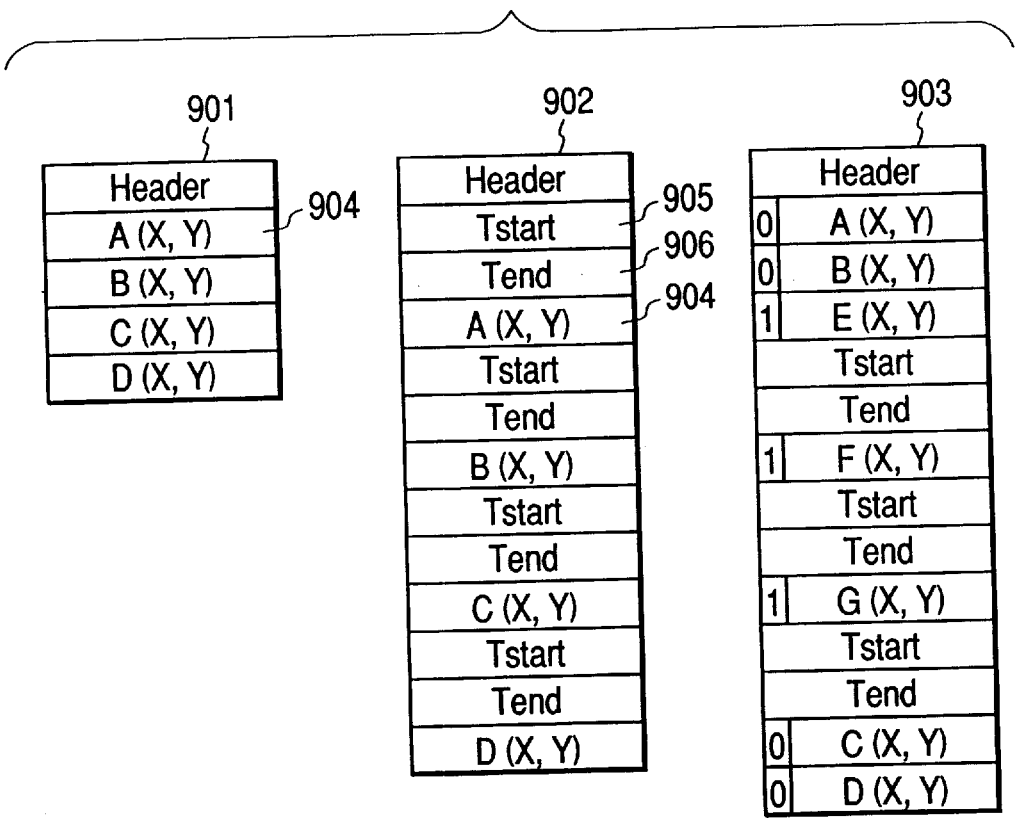
FIG. 9 is a diagram for explaining a method of extending creation/destruction time for coordinate points.
Figure 9:
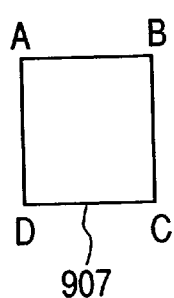
Figure 9:
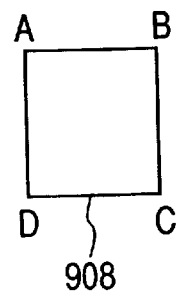
Figure 9:
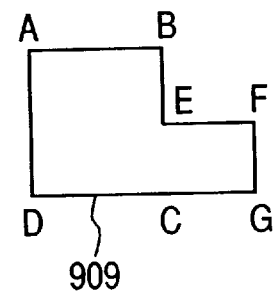

FIG. 9 shows an example of time extension applied to coordinates in the same manner as for features.

In this time extension, creation/destruction extension of coordinates due to time elapse is represented.

This is achieved by appending created time Tstart (905) and destroyed time Tend (906) to each item of coordinates information 904 in a data structure 901 of feature to form a set of information items, as in a data structure 902.

Creation/destruction of coordinates can be used when a drainpipe, for example, is represented as one feature and the position and direction of the drainpipe change as a result of extension work.

In other cases, creation/destruction of coordinates can be used when the shape (contour lines) of precipice changes due to a landslide or when the shape of house changes as a result of extension.

However, the data structure 902 is redundant in that all coordinates have time information.

A data structure 903 is an extension of the data structure 902, implementing data compression.

In the data structure 903, a one-bit time extension flag is provided in the start of each coordinate information item.

When the time extension flag is '1', the coordinate point has created time and destroyed time, and when '0', it has no time information.

Created time and destroyed time of coordinate points having no time information follow created/destroyed time of the entire feature stored in the header of the feature.

Assume that house 907 represented in the data structure 901 was extended to house 909 at time Tstart.

As a result of newly adding coordinate points E, F, and G to rectangle ABCD, polygon ABEFGCD was formed.

In this case, coordinate points E, F, and G are inserted together with start time and end time between points B and C.

The table has the data structure 903.

Figure 10:
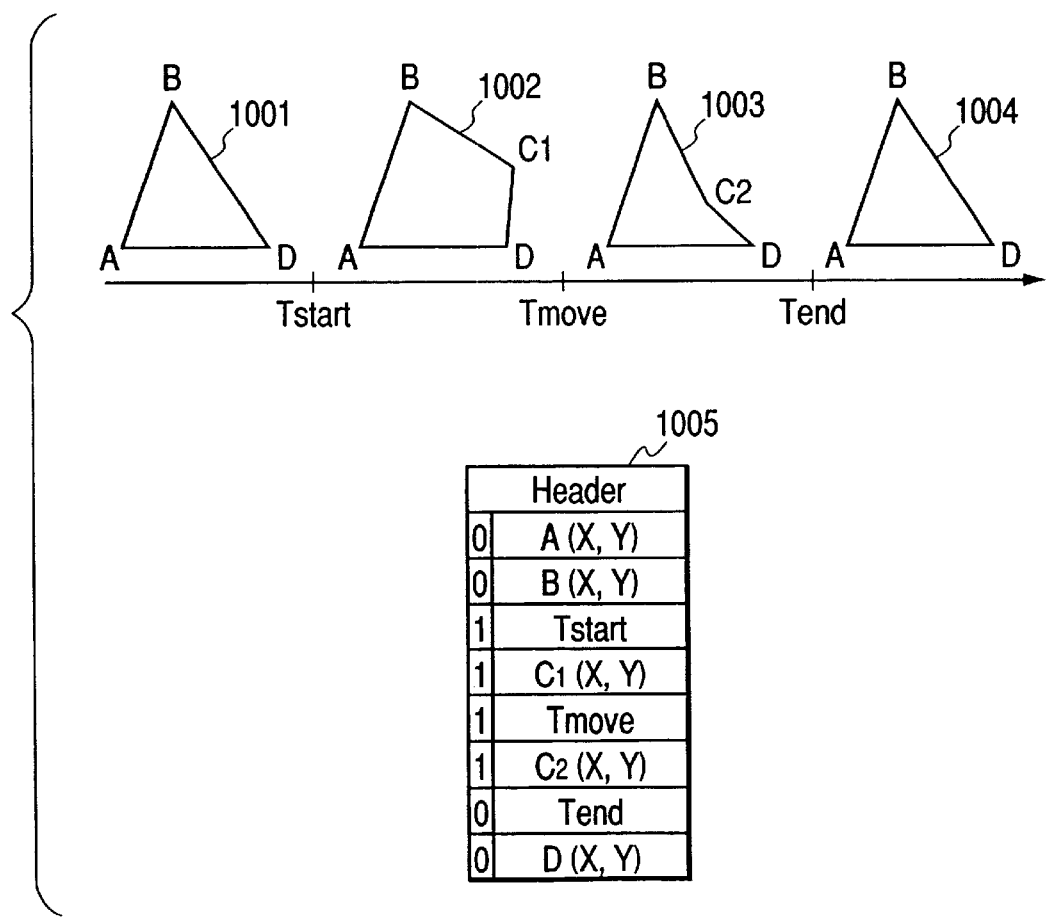
FIG. 10 is a diagram for explaining a method of extending change time for coordinate points.

FIG. 10 shows another example of time extension applied to coordinate points.

The following description is about the situation in which coordinate point C1 is appended to feature ABD (1001) at time Tstart (1002), coordinate point C1 changes to C2 at time Tmove (1003), and C2 is deleted at time Tend.

In this time extension, creation/destruction extension and change extension are appended to coordinate point information.

Data structure 1005 shows an extended version of the data structure 903 with change extension appended to coordinate point information.

Created time Tstart and destroyed time Tend are added to coordinate point C subjected to time extension, and zero or more change information items, that is, a set of feature changed time Tmove and new coordinates as a differential value of the changed attribute is inserted. '1' and '0' are flags indicating continuation of description; '1' indicates that a description continues up to destroyed time Tend, and '0' indicates that no description continues.

Figure 11:
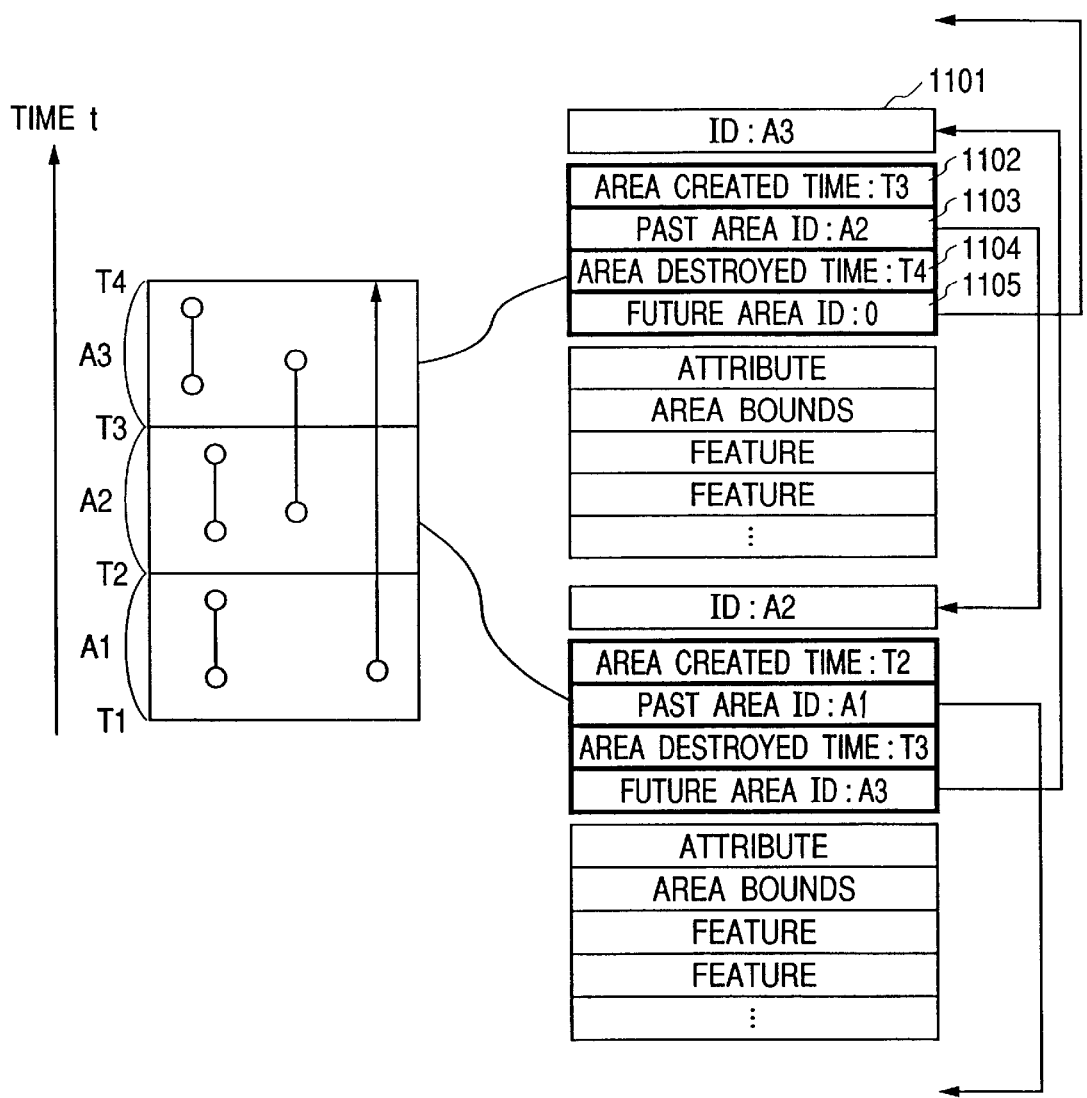
FIG. 11 is a diagram for explaining a method of extending replacement time for areas.

FIG. 11 shows an example of time extension for an area table.

By providing an area with a time range and splitting the area in a given period of time (e.g., one year), geographic information can be fast searched.

When all geographic information is searched for geographic information existing at a certain point of (x, y, z, t) or geographic information existing within a certain time range, instead of thoroughly searching all features in all areas within the system, by first narrowing in terms of space and time areas containing coordinates to be obtained, then searching the narrowed areas for features, resulting in increasing the speed of the search operation can be sped up.

FIG. 11 represents replacement extension of an area.

Created time 1102 and destroyed time 1104 are appended to area information 1101, and an ID 1103 of an area before creation is inserted as additional information of created time 1102 and an ID 1105 of an area after destruction is inserted as additional information of destroyed time 1104.

As a result of this extension, created/destroyed time means not creation and destruction of area, but the time of switching to a next linked area.

As another example of replacement extension of area, when the total capacity of geographic information DB increases to such an extent that it does not fit in the system, one possible use method is to split the area so that old geographic information is saved to a different geographic information DB or external storage such as DAT.

By making link destination ID before creation or after destruction empty, creation or destruction of area can be represented.

An example of creation or destruction of area occurs when a district named A is destroyed and a district newly named B is created.

In this case, for the district named A, a link destination ID after destruction is made empty, and for the district named B, a link destination ID before creation is made empty and an identifier (∞) indicating undecided destruction time is stored in the link destination ID after destruction.

Figure 12:
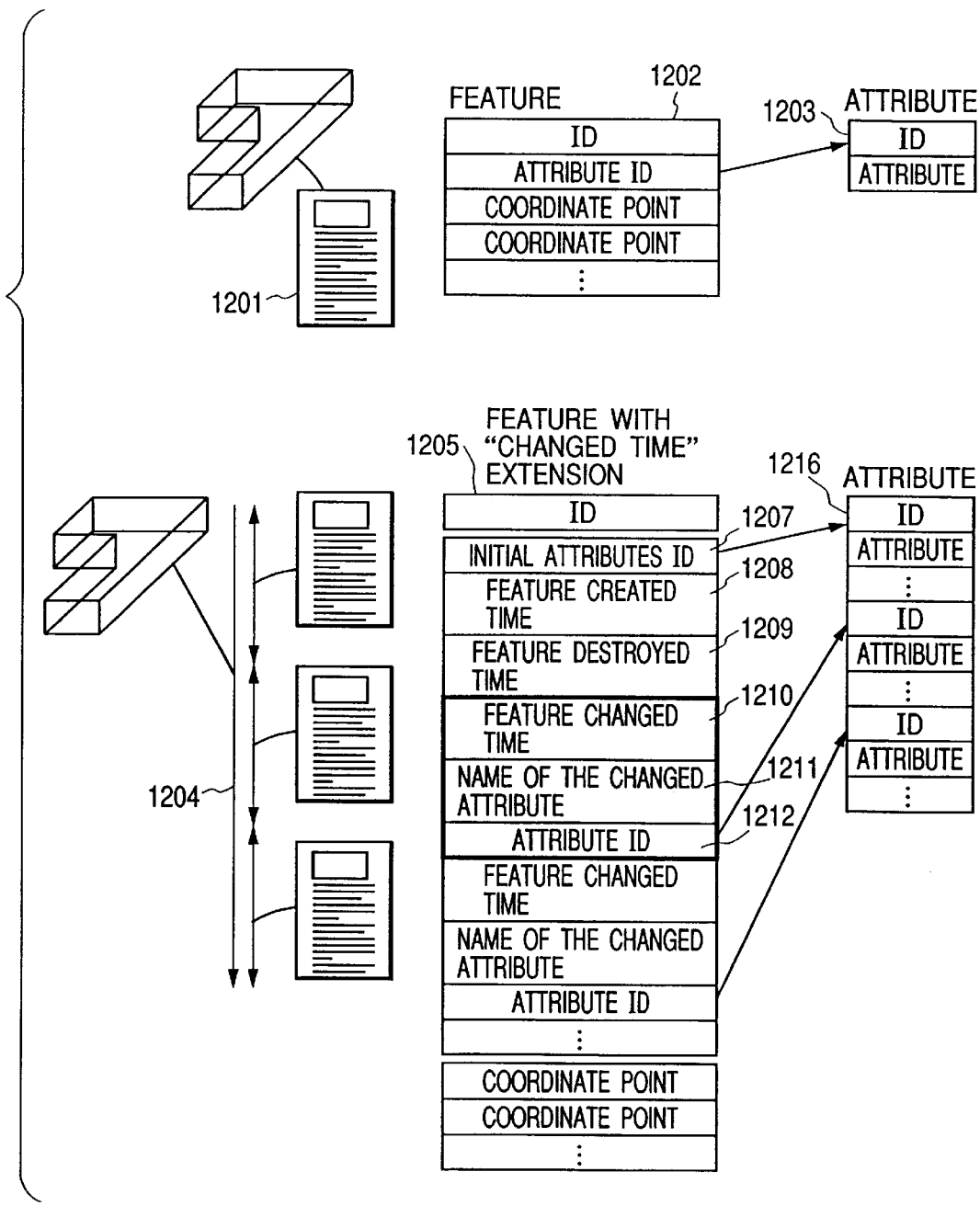
FIG. 12 is a diagram for explaining a method of extending change time for attributes.

FIG. 12 shows an example of time extension for attribute information.

Attribute information is a document, image, and the like (1201) linked to a feature. Usually, an attribute is managed as attribute (1203) in a different table and the ID of the attribute is stored in the feature (1202).

Herein, when an attribute (1203) changing with time, for example, the number of inhabitants changing with yearly researches, is managed, time extension for attribute information is used.

Change extension shown in FIG. 6 is performed for feature information 1202 (1205) such that created time 1208 and destroyed time 1209 are appended and zero or more sets of feature changed time 1210 between the created time 1208 and destroyed time 1209, name of the changed attribute 1211, an attribute ID 1212 are inserted, and attributes indicated as the attribute ID 1212 are managed in a table indicated as an attribute 1206 in the figure.

Figure 13:
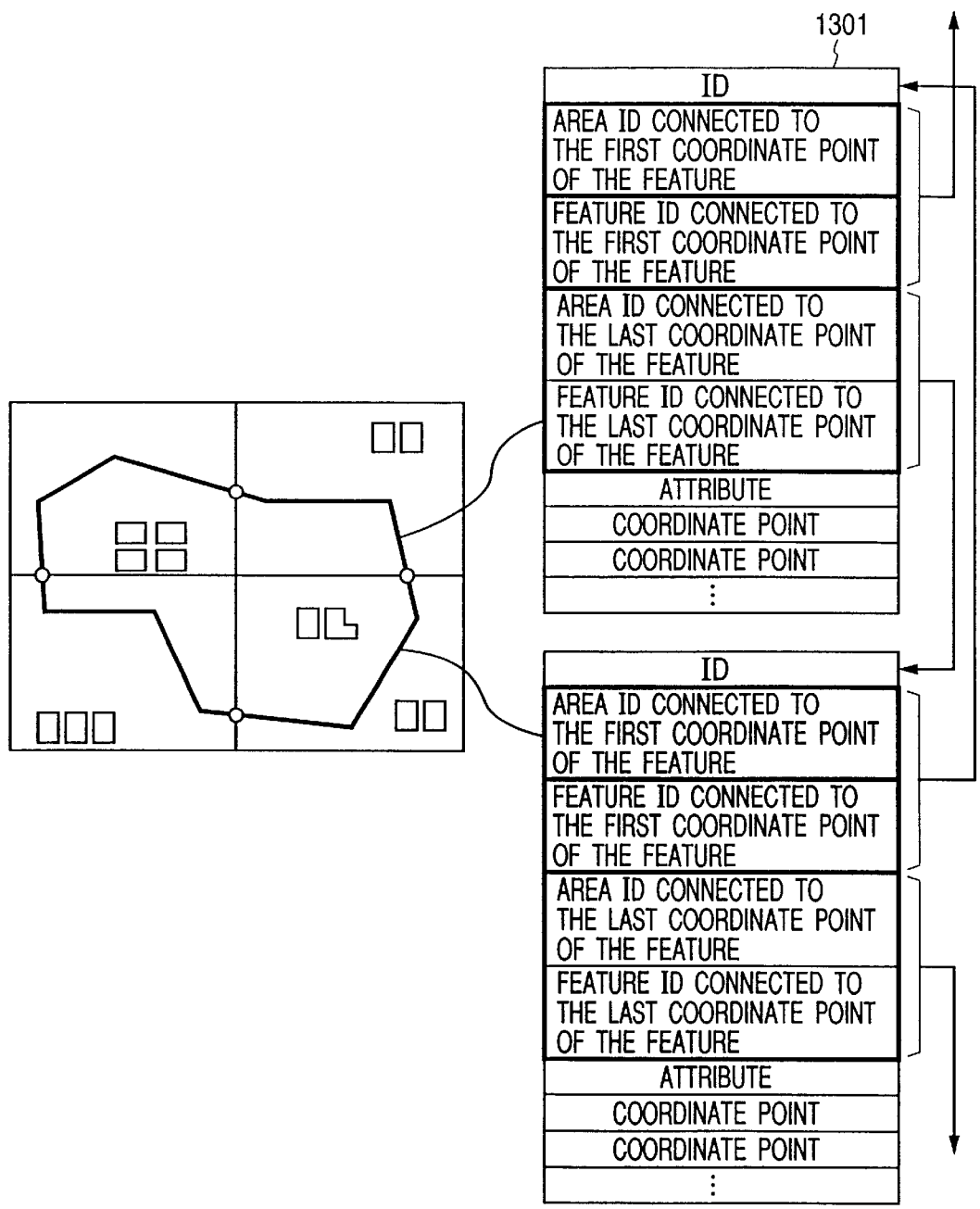
FIG. 13 is a diagram for explaining a method of representing features connected between areas in XY coordinate directions.
Figure 14:
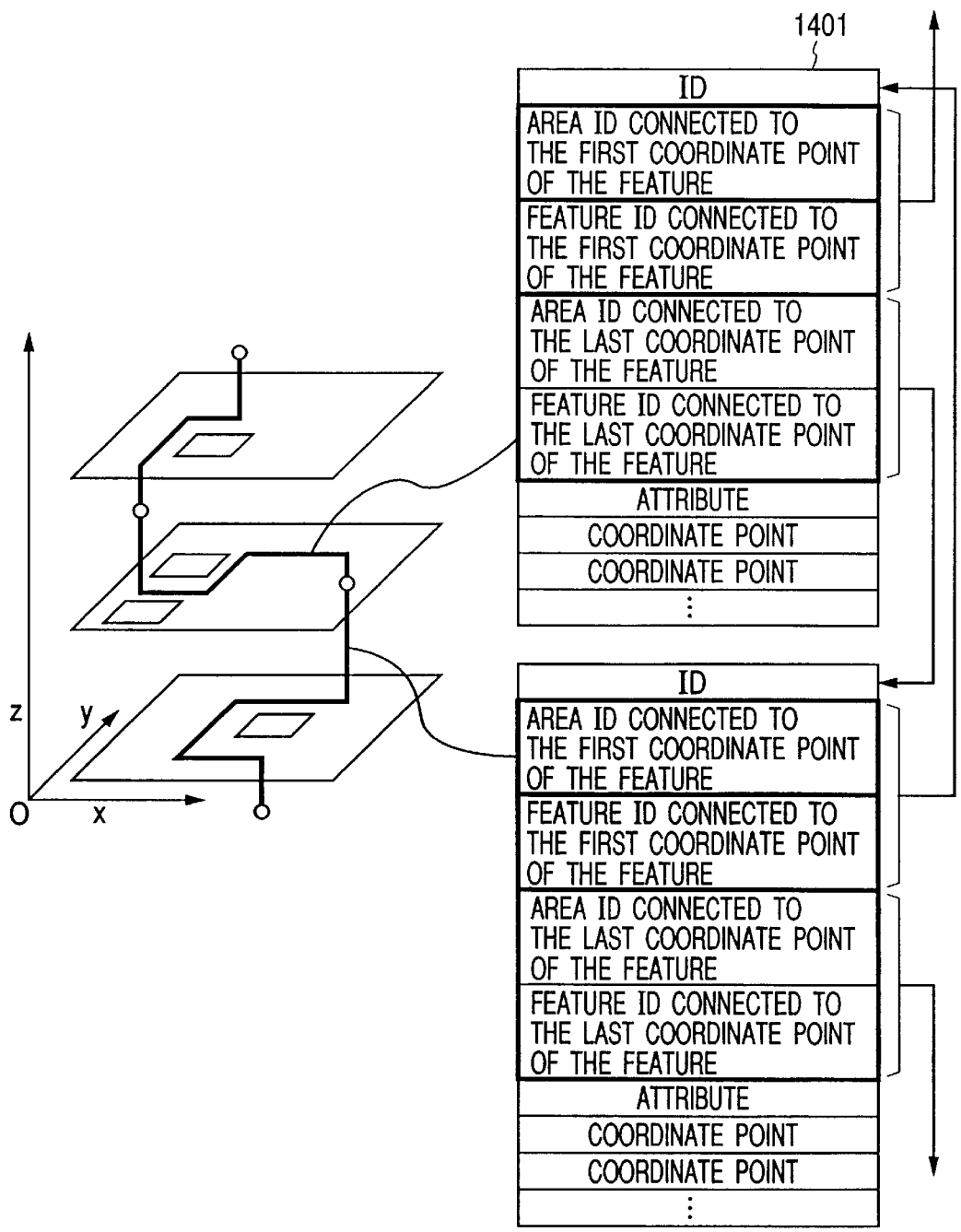
FIG. 14 is a diagram for explaining a method of representing features connected between areas in Z coordinate direction.

FIGS. 13 and 14 show an example of application in space direction of replacement extension, one of time extensions of geographic information of the present invention.

FIG. 13 shows four areas separated in mesh form.

Some huge features stored in the areas, for example, national roads, which extend to two or more drawings and areas.

These features are divided on an area boundary and the two divided features have no relation with each other in that state.

When features must be handled as a unit, for example, in a case where the shortest distance search is performed using a road network, some relation must be provided for them.

As a method for solving the problem, replacement extension is applied to between space areas.

Generally, a feature is represented by poly-line and has a start point and an end point. Accordingly, in the feature table 1301 are stored the ID of a feature connected to the start point and the ID of a feature connected to the end point. When a feature ends at a start or end point, an end ID (0) is stored.

To point to a feature extending beyond one area, a pair of the connected area ID and the connected feature ID is stored. The area ID may be automatically computed as an adjacent area.

In this way, by storing the ID of a feature continuing to adjacent areas as the connected feature ID, a huge feature extending beyond one area can be represented.

FIG. 14 shows a management diagram of a building with multiple floors.

The building can be represented by a combination of plane views separated for each floor.

However, there are huge features extending to two or more floors, such as electrical wiring lines.

By dividing each floor to areas, setting the start and end points of feature on vertical boundaries of the floors, and storing the ID of feature continuing to adjacent areas as a pair of connected area ID and connected feature ID, a huge feature extending in height direction can be represented.

Next, a description will be made about a method of splitting an area by time as a method of maintaining geographic information DB of the present invention, which manages time history.

Since the time history management method of the present invention handles past geographic information and the latest geographic information at the same level, excessively increased past information causes an increase in DB storage space and longer search time, reducing system performance.

Therefore, to improve efficiency, an area is split to "old area" for the far past and "new area" for the recent past so that, to search for a recent change of feature, feature data thereof is searched for not from all areas, but from only the new area.

The same also applies to searching of past features. It is efficient to split an area by time, e.g., in the units of years to search in a way that first an area containing a time range to be searched is obtained, and then the area for feature data is searched.

To split an area requires splitting area information itself and sorting out and splitting feature information contained therein.

Some features are wholly contained a time range of area and others extend into different times of area splitting.

For features wholly contained in a time range of area, the areas in which the features are contained have only to be sorted out, while for features extending into different times of area splitting, one of the following methods must be taken: duplicating managing them in two areas; managing them only in either of the areas; and splitting the features themselves.

A method of sorting out and splitting features attendant on area splitting will be described for each of the three cases of (1) splitting an area to improve search speed; (2) saving a past history to backup media; and (3) a client requesting the latest geographic information from a server.

Figure 15:
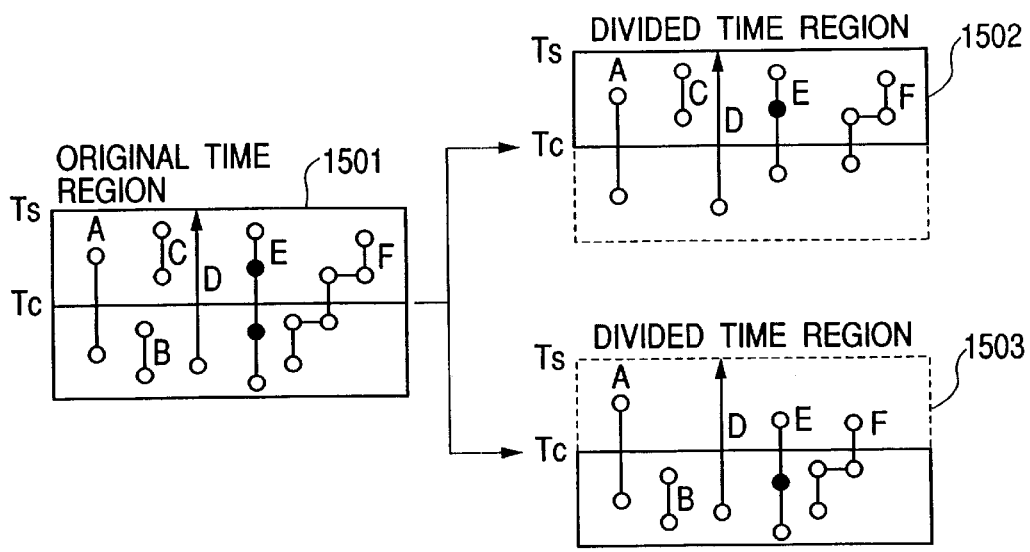
FIG. 15 is a diagram for explaining a method of splitting an area to speed up a search operation.

FIG. 15 shows the case of splitting an area to improve search speed.

As described above, it is efficient to split an area by time, e.g., in years so that searching is performed in a way that first an area containing a time range to be searched is obtained, then the area for feature data is searched.

When area 1501 is devided to areas 1502 and 1503 at time Tc, the devided areas 1502 and 1503 must contain all features contained in their respective time ranges. Accordingly, features across time Tc must be duplicately managed in both areas.

Features A, B, C, and D of creation/destruction extension, feature E of change extension, and feature F of replacement extension are split by the method described below.

Of features subjected to creation/destruction extension, feature A extending into two areas is duplicately managed in both areas.

Features B, C existing only in one area are managed only in that area.

Still existing feature D with undecided destroyed time is also managed in both areas.

Feature E subjected to change extension is split into two pieces of feature information at a time closest to the split time Tc.

To provide for the case where a time search is performed in the vicinity of a split time, portions across the split time are duplicately managed in both areas. The two pieces of feature information are linked to each other as a feature subjected to replacement extension.

As a feature subjected to replacement extension, to provide for the case where a time search is performed in the vicinity of a split time, feature F across the split time Tc is duplicately managed in both areas. The values of link destination IDs are unchanged.

The above described management method is redundant because features across a split time are duplicately managed.

Particularly, when a time history of urban geographic information is managed in the order of several years, the feature D appearing most frequently of feature information of FIG. 15, which is unchanged after creation, requires much storage space because it is duplicately managed.

Figure 16:
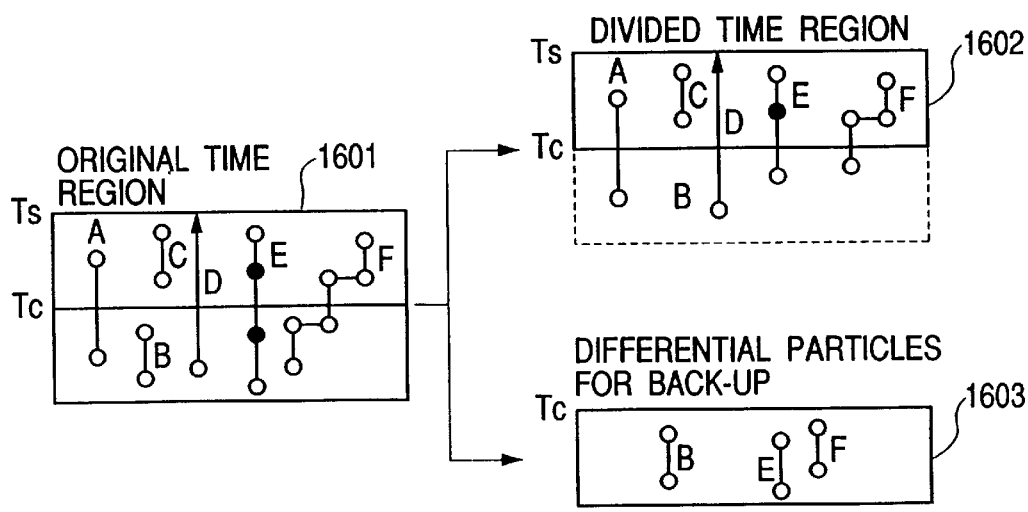
FIG. 16 is a diagram for explaining a method of splitting an area to save and store a past history to backup media.

FIG. 16 shows the case of saving a past history to backup media.

When an area 1601 is devided to areas 1602 and 1603 at time Tc, the area 1602 closer to the present, of the split areas, contains all features included in the time range.

The area 1603 for saving to backup media, previous to time Tc, contains no features across time Tc. This prevents the duplication of features and reduces the storage capacity to a minimum.

FIG. 16 shows area split processing.

Features A, B, C, and D of creation/destruction extension, a feature E of change extension, and a feature F of replacement extension are split by the method described below.

Of features subjected to creation/destruction extension, the feature B existing only in the old area 1603 is managed in the old area and other features A, C, and D are all managed in the new area 1602.

The feature E subjected to change extension is split so that the only portion in a time range wholly contained in the old area 1603, of time ranges separated by feature changed times, is managed in the old area 1603.

Portions across a split time are not duplicately managed. The two pieces of feature information are linked to each other as a feature subjected to replacement extension.

The feature F subjected to replacement extension is sorted out so that only portion wholly contained in the old area 1603 is managed in the old area 1603.

Portions across a split time are not duplicately managed.

The values of link destinations ID are unchanged. For a time search previous to time Tc, both the areas 1602 and 1603 are searched. For a time search more recent than time Tc, only the area 1603 may be searched.

Figure 17:
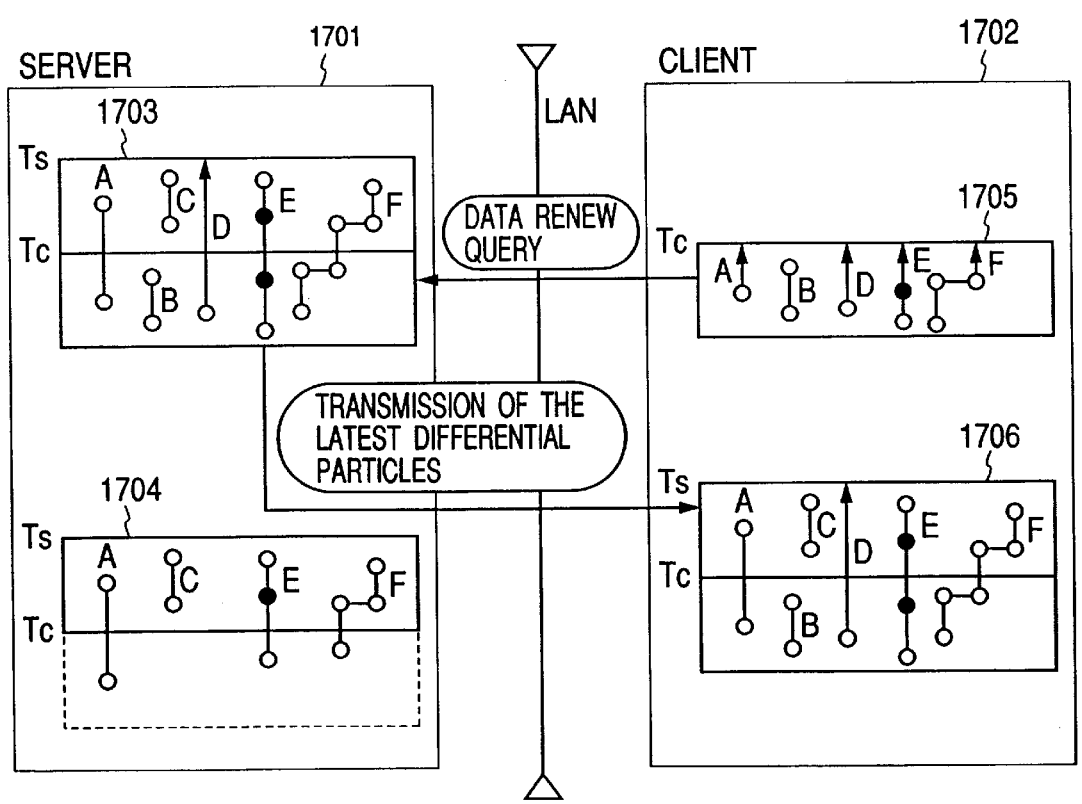
FIG. 17 is a diagram for explaining a method of splitting an area to update geographic information between a client and server.

FIG. 17 shows the case where a client requests the latest geographic information from a server.

The present invention achieves reduced network load and high responsibility by application to communications among a plurality of geographic information DB servers distributed over networks such as LAN, and clients.

A function is necessary which allows a plurality of users to refer and update geographic information stored in DB servers on a network at their respective clients.

In organizations such as local autonomies which use a Geographic Information System, some sections perform maintenance on geographic information, and others utilize it; they cross each other.

Maintenance on geographic objects is respectively performed by sections in charge of them; for example, roads are managed by the Road section, and water and sewer pipelines are managed by the Waterworks section.

Maintenance on geographic information that is huge in volume is performed by a plurality of different responsible persons assigned to different areas.

On the other hand, the volume of geographic information is generally large. For example, about 1 MB of geographic information is required for an average area (500 m×500 m). Four-dimensional geographic information would require more volume.

Therefore, a problem is to reduce communication time and overload on a network when geographic information is uploaded or download. This problem is needed to solve more significant particularly when communications are performed over telephone lines of slow transfer speed.

Hereinafter, a description will be made about a method of transmitting differential particles of geographic information to solve this problem.

Four-dimensional geographic information which manages geographic object in spatial and time dimension, that is large in volume is distributed to clients in advance using mass-storage media such as CD-ROM and DVD-RAM.

When users request the latest geographic information, differential particles of four-dimensional geographic information, as the latest geographic information, are distributed to the users via a network.

In FIG. 17, assume that a client 1702 has the latest data 1705 at time Tc and geographic information having been updated between times Tc and Ts is downloaded at present time Ts.

Assume that features A, B, C, and D of creation/destruction extension, a feature E of change extension, and a feature F of replacement extension are stored in the server (1703).

When a geographic information history between Tc and Ts is requested from the client, the server returns the latest differential particles 1704. The latest differential particles 1704 are produced for only features that changed between times Tc and Ts.

Of features subjected to creation/destruction extension, the latest differential particles are produced for A that was destroyed between times Tc and Ts, and C that was created and destroyed.

The feature E subjected to change extension is split by the shortest length including the split time Tc of the change time.

For the feature F subjected to replacement extension, only features that changed between times Tc and Ts are stored. The values of link destination IDs are unchanged.

Upon receipt of the latest differential particles 1704, the client adds the latest differential particles 1704 to the geographic information 1705 it has, and thereby can obtain the latest four-dimensional geographic information 1706 as of time Ts.

According to this method, since only updated geographic information 1704 passes through the network, communication time and network load can be reduced.

When the client wants only currently valid geographic information without wanting history information, only currently valid particles (features not destroyed) of the latest differential particles 1704 have to be transmitted, so that communication time and network load can be further reduced.

A description will be made of a method of fast spatial searching for geographic information including history information.

This method of storing geographic information including time history information has two merits as described above: (1) reducing an information storage area; and (2) increasing the speed of a search including time.

However, there are many cases of a search not including time such as area scenery display. Particularly scenery display requires a fast spatial search because geographic information must be redrawn while changing view points in real time.

Four-dimensional geographic information containing time slows down a search operation in comparison with three-dimensional geographic information because past history not required for a scenery display coexists in features and coordinate points.

To solve the problem, when a space area and time are searched, three-dimensional geographic information is reconstructed by extracting only features existing at the time from original four-dimensional geographic information in the area.

The reconstructed three-dimensional geographic information is stored in a temporary area and can be substituted for the original information to perform a speed-oriented search not including time such as scenery display.

According to the present invention, first, the data amount of geographic information can be reduced.

Providing that the size of geographic information not containing time information is C, the geographic information has been updated n times, and the ratio of geographic information changed per update to the whole is p, the current size of geographic information becomes (1+n)C with the conventional method which backs up the entire geographic information, on the other hand it becomes (1+pn)C with the present method.

Providing that update count n is 100 and the ratio p of update locations is 1%, this method reduces data size by a factor of about 50, compared with the conventional method.

According to the present invention, geographic information of any time can be extracted.

In the conventional method, because of the problem of data amount, an update interval is long, for example, once a year, and therefore no status can be obtained throughout the interval.

The present invention, during updating, appends time information indicating when objects to be updated changed, thereby enabling geographic information of any time to be extracted.

What is claimed is:

1. A geographic information data management method which handles as geographic information data including feature, coordinate, area and attribute information of geographic objects, and registers the geographic information data in a database for management, the geographic information data management method comprising the steps of:

when any one of the feature, coordinate, area and attribute information is created, creating data of the feature, coordinate, area and attribute information is created, and storing a created time in the geographic information data thereof to register the geographic information data in said database; and when any one of the feature, coordinate, area and attribute information is destroyed, storing a destroyed time in geographic information data thereof stored in said database to register the geographic information data in said database.

2. A geographic information data management method according to claim 1, wherein the geographic information data is provided with an ID number, when a geographic information is replaced, the ID number of geographic information data before the replacement is stored in the data of the geographic information after the replacement as additional information of created time thereof and the ID number of the geographic information data after the replacement is stored in the data of the geographic information as additional information of destroyed time thereof, so that each geographic information data is registered in said database.

3. A geographic information data management method according to claim 1, wherein to a client system connected to said database through a network, geographic information data obtained in the past in the client system is transferred as the change differences of between said geographic information data obtained in the past and geographic information data at a specified time.

4. A geographic information data management method according to claim 1, which further comprises the steps of extracting geographic information data existing at a specified time from the database, the step of rebuilding a rebuilt database in which time data is excluded from the extracted geographic information data, and the step of retrieving data for the rebuilt database.

5. A geographic information data management method which handles as geographic information data including feature, coordinate, area and attribute information of geographic objects, and registers the geographic information data in a database for management, the geographic information data management method comprising, when any one of the feature, coordinate, area and attribute information changes, storing, in geographic information data, a change occurrence time, a changed attribute of the geographic information, and a change amount of the changed attribute, respectively as changed time, name of the changed attribute, and differential value of the changed attribute to register the geographic information data in said database.

6. A geographic information data management method according to claim 2, wherein a rotation angle, change of position, and enlargement ratio of the feature are parametrically set such that changes of the feature are represented by parameters.

* * * * *